No. 644,807. Patented Mar. 6, 1900.
R. C. SAYER.
FLUID PRESSURE JOINT FOR PISTONS.
(Application filed Aug. 3, 1899.)
(No Model.)

Witnesses.
Samuel Percival
Frederick Burnham

Inventor:
Robert Cooke Sayer
By his Attorneys.
Wheatley & MacKenzie

UNITED STATES PATENT OFFICE.

ROBERT COOKE SAYER, OF BRISTOL, ENGLAND.

FLUID-PRESSURE JOINT FOR PISTONS.

SPECIFICATION forming part of Letters Patent No. 644,807, dated March 6, 1900.

Application filed August 3, 1899. Serial No. 726,045. (No model.)

*To all whom it may concern:*

Be it known that I, ROBERT COOKE SAYER, a subject of the Queen of Great Britain and Ireland, residing at Clyde road, Redland, Bristol, in the county of Gloucester, England, have invented certain new and useful Improvements in Fluid-Pressure Joints for Pistons, (for which I have made application for patent in Great Britain, No. 8,521, dated April 24, 1899;) and I do hereby declare the following to be a full, clear, and exact description of the invention, such as will enable others skilled in the art to which it appertains to make and use the same.

This invention has for its object to utilize the pressure in the cylinder to prevent leakage past the piston; and it consists in causing the pressure to act on a split ring to expand it and force it and a packing against the surfaces to be packed.

Figure 1:
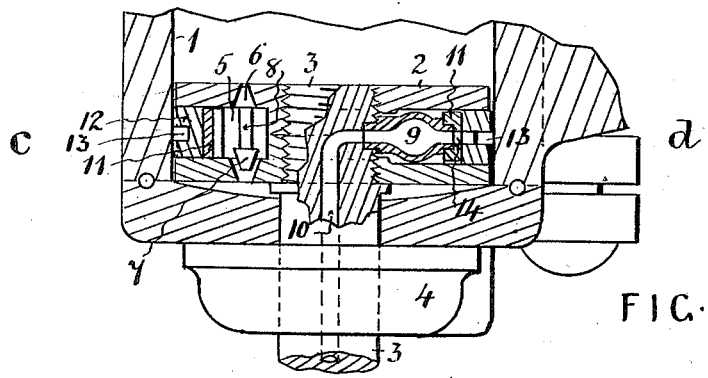
Figure 2:
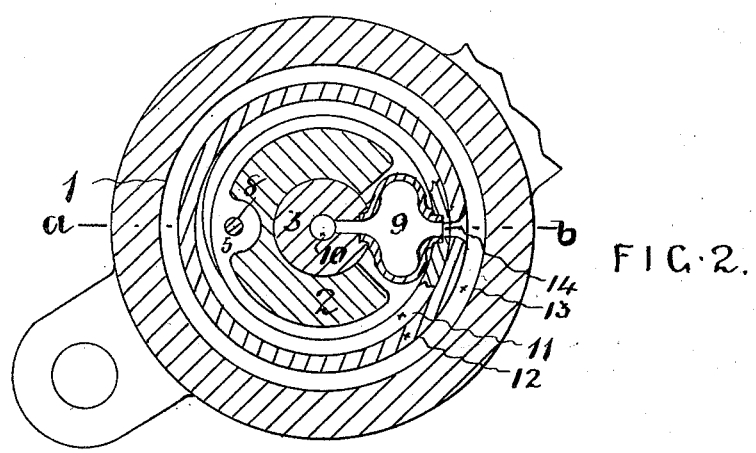
Figure 3:
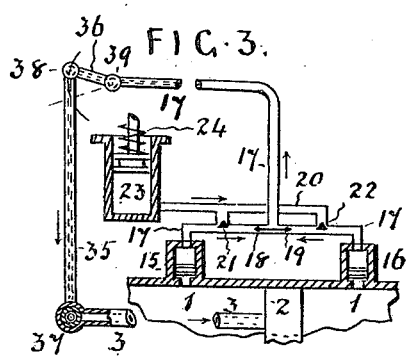
Figure 4:
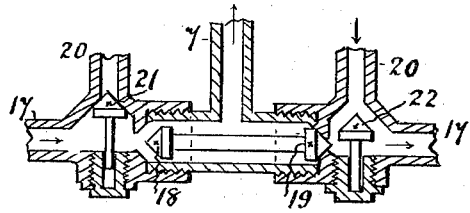

In the accompanying sheets of illustrative drawings, Figure 1 is a section of a piston at $a\ b$ on Fig. 2. Fig. 2 is a sectional plan at $c\ d$, Fig. 1. Fig. 3 is a diagrammatic view. Fig. 4 is a diagrammatic view of the valves.

The pressure-cylinder 1 contains the piston 2, whose rod 3 passes through its glands 4. The piston 2 has a chamber or space 5, in which seats for valves 6 and 7, connected by the rod 8, are formed, so that when one is open the other is shut, also a space containing an expanding joint or vessel 9, that expands, with a split ring 11 connecting with a passage 10, a hole 14 in the split ring 11, and packing 12 in contact with the sides of the cylinder 1 and piston 2 and with an annular space 13. It also connects with the pipe 17, Fig. 3, through the tubes 35 and 36, having hinges 37, 38, and 39. The tube 17 contains the valves 18 and 19, like 6 and 7, connecting with chambers 15 and 16, containing rams open to either end of the cylinder 1. The pipe 17 has branches 20, with valves 21 and 22, connecting with a reservoir 23 of lubricant under pressure of a weight or spring 24 and ram.

The working is as follows: Pressure being admitted below the piston 2 it opens the valves 7, closes 6, acts against the ring 11 to thrust the packing 12 against the sides of the cylinder 1, gives a pressure to the ram and lubricant in its chamber 15, closes the valves 21 and 19, allows the lubricant to flow through valve 22, opens 18, passes to the passages 17, 10, 9, 14, and 13, thrusts the packing 12 against the piston 2 and cylinder 1 and keeps it lubricated, the packing 12 preventing escape. By this construction when not required to be effective the friction of the packing is minimized.

In modification the valves 6 and 7 and vessel 9 are not used, but the lubricant from the reservoir 23 goes to the chamber 5 to act on the ring 11, and by passages 14 and 13 act as above.

In both cases the fluctuations of the pressures in the cylinder are repeated on the packings.

What I claim, and desire to secure by Letters Patent, is—

1. A cylinder, a ram connected to the cylinder, a lubricant-reservoir connected to the ram, a valve between the reservoir and ram, hollow jointed links connected to the ram, a valve between the links and ram, a hollow piston-rod connected to the links, a piston with chamber working in the cylinder, a groove around the piston and connected with the chamber and a packing in the groove.

2. A cylinder, a ram connected to the cylinder, a lubricant-reservoir connected to the ram, a valve between the reservoir and ram, hollow jointed links connected to the ram, a valve between the links and ram, a hollow piston-rod connected to the links, a piston with annular groove working in the cylinder, a packing-ring fitting in the groove, a cylinder-packing with annular groove, a flexible connection between the annular groove and the hollow piston-rod, and a valve in the piston and leading to the chamber.

In testimony whereof I have affixed my signature in presence of two witnesses.

ROBERT COOKE SAYER.

Witnesses:
W. HURLEY CLARKE,
LIONEL A. WILSON.